UNITED STATES PATENT OFFICE.

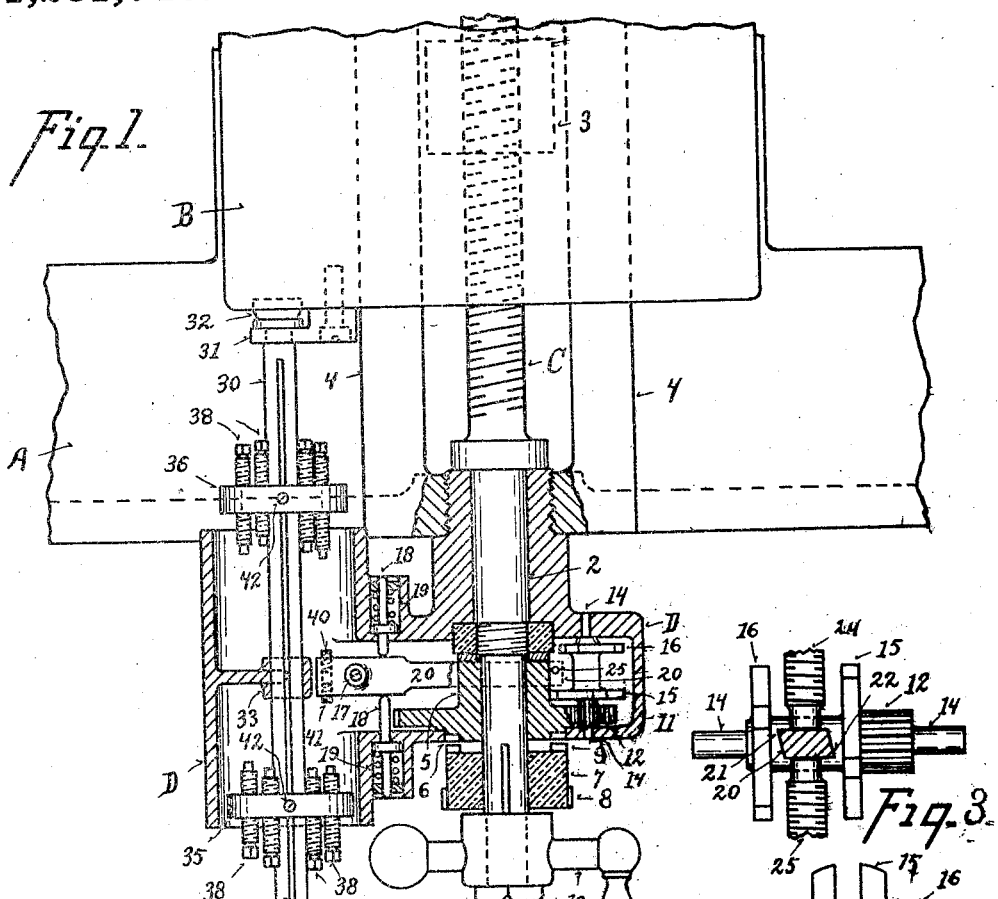

WILLIAM L. SCHELLENBACH, OF WYOMING, OHIO.

TOOL-HOLDER STOP MECHANISM.

1,231,946.    Specification of Letters Patent.    Patented July 3, 1917.

Application filed February 23, 1917. Serial No. 150,404.

*To all whom it may concern:*

Be it known that I, WILLIAM L. SCHELLENBACH, a citizen of the United States, residing at Wyoming, in the county of Hamilton and State of Ohio, have invented certain new and useful Improvements in Tool-Holder Stop Mechanism, of which the following is a specification.

My invention relates to improvements in tool carriage mechanism for machine tools. One of its objects is to provide an improved stop mechanism for the cross feed tool holder. Another object is to provide a stop mechanism actuated directly by and from the movements of the cross feed tool holder. Another object is to provide convenient means to connect the stop mechanism with and disconnect it from the cross feed screw. Another object is to provide a cross feed stop mechanism in which the stop mechanism is positive and accurate in its action as soon as the contact faces have engaged. Another object is to provide a positive stop mechanism in which further tension applied to the cross feed screw after the contact faces have engaged will not result in wedging and cramping or binding the transmission mechanism thereof. Another object is to provide a conveniently arranged, located and applied stop mechanism. My invention also comprises certain details of form, combination and arrangement, all of which will be fully set forth in the description of the accompanying drawings in which—

Figure 1 is a plan view, partly in section of a lathe tool carriage embodying my invention.

Fig. 2 is a front elevation of the same, with the housing partly broken away and the feed screw broken to omit the feed screw handle and one of the clutch members.

Fig. 3 is a detail of the pawl and ratchet wheels by means of which the stops are effected, detached.

Fig. 4 is an end elevation of the same detached.

The accompanying drawings represent the preferred embodiment of my invention applied to a lathe tool holder in which A represents the main or longitudinally traveling lathe tool carriage. B represents the cross feed tool carriage or tool holder mounted to travel in transverse ways on the main carriage A. C represents the cross feed screw rod which is journaled and held against end play in a bearing 2 carried by and forming part of the carriage A. The cross feed carriage B has a nut 3 engaged by the threaded portion of the screw rod to feed the carriage B transversely of the carriage A on ways 4, in either direction.

In order to provide a stop mechanism to limit this feed of the carriage B in each direction I provide a housing D in front of the carriage A and in this housing loosely mounted on the screw rod C is a sleeve 5 the forward end of which projects through the housing and is provided with clutch teeth 6. A clutch member 7 with a knurled head 8 is splined to move endwise on the screw rod C, with teeth 9 to be moved into and out of engagement with the teeth 6 of sleeve 5 to connect or disconnect the sleeve 5 in driving relation to the screw rod. The screw rod C is provided with a handle 10 by means of which it is manually operated.

On the sleeve 5 is a spur-gear 11 which meshes with a pinion 12 on the shaft 14 journaled in opposite walls of the housing D, whereby the pinion and shaft 14 are driven at relatively greater speed than the screw rod C. The shaft 14 carries two ratchet wheels 15 and 16, preferably with teeth set in opposite directions, or if desired with radially projecting teeth.

A lever 20 pivotally supported at 17 has its shorter end supported between spring actuated plungers 18 seated in recesses 19 in the housing D to engage opposite sides of lever 20 to normally hold the lever 20 in position along a medial line with its longer free end occupying a position intermediate of the ratchet wheels 15 and 16, and in position to be deflected from its normal position so as to engage the teeth of either ratchet wheel, and thereby stop the rotation of the shaft 14, and through the gear 11 and pinion 12 to prevent further rotation of the screw rod C. As illustrated in section in Fig. 3 the free end of lever 20 has beveled or knife edges 21 and 22 facing in opposite directions to engage the teeth of wheels 15 and 16, and the free end of lever 20 is supported to move transversely between the ends of supporting screws 24 and 25, to prevent the end of lever 20 being bent or deflected from its normal and proper position. It will thus be noted that when the lever 20 engages the ratchet teeth of either wheel 15 or 16 the shaft 14 and feed screw are positively brought to an immediate stop, and that further strain applied to the screw rod C will not result in wedging, cramping or straining the parts so that when the screw rod is reversed the stop members will fail or refuse to disengage. The relation of the stop members, on the contrary is such that when the strain thereon is released they are free to separate and assume their normal positions ready to perform their function again. Also when the lever 20 engages the teeth of one of the ratchet wheels the shaft C is immediately locked against any further movement, except through breaking of one of the locking members, which provides for accuracy in the work produced through prompt and effectual stopping of the feed.

In order to actuate the lever 20 I provide a shaft 30 journaled at one end in a block 31 detachably attached directly to the tool carriage B. I also preferably provide a block of cork or rubber 32 to press against the end of the shaft 30, or equivalent means to prevent the shaft 30 turning too freely in its bearings, and thus being displaced accidentally or from vibration, from its adjusted positions. Near its opposite end the shaft 30 is supported in a bearing 33 forming part of the housing D. The shaft 30 has a key seat 34 along the greater portion of its length and two collars 35 and 36 are mounted upon the shaft 30 and held in relative alinement thereon by means of set screws 42, the inner ends of which enter the key seat 34 and travel therein to permit the collars to be adjusted endwise on the shaft 30, and also serve to lock the collars to their adjusted positions. A series of contact screws 38 say six are threaded through the respective collars 35 and 36 so as to occupy positions equidistant from and parallel to shaft 30, and spaced equidistant from each other. A pair of adjustable contact screws 40 and 41 are threaded to the lever 20 in axial alinement with each other and in position to contact with any selected pair of contact screws 38 carried by the respective collars 35 and 36 by rotating the shaft 30 to bring the desired pair of contact screws into alinement with the screws 40 and 41. Thus each pair of screws on the collars may be successively shifted into alinement with screws 40 and 41 for use. Should it be necessary to change or reset the tool carried on the tool carriage B before the desired number of duplicate pieces of work have been produced, it will only be necessary to readjust the contact screws 40 and 41, instead of requiring readjustment as heretofore of all the screws carried by the collars 35 and 36. When not required for use the shaft 30 may be detached and removed and the clutch member 7 disengaged from the teeth 6, and the screw employed in the usual manner. It will be noted particularly that the shaft 30 is attached to and moves forward and backward with the carriage B, and that the stop movement of lever 20 and the ratchet wheels 15 and 16 is positive and instantaneous without liability to bind or cramp the locking members.

The mechanism herein illustrated is capable of considerable modification without departing from the principle of my invention.

Having described my invention what I claim is:

1. In combination with a hand operated feed screw shaft, a tool holder to be fed in either direction by said feed shaft, a stop member positively rotatively driven by said feed shaft, and a stop member to engage with said rotatively driven stop member, and means to actuate said last named stop member from and at predetermined positions of the tool holder.

2. In combination with a hand operated feed screw shaft, a tool holder to be fed in either direction by said feed shaft, a toothed wheel positively driven in either direction from said feed shaft, a lever to engage said toothed wheel to stop the rotation of said feed shaft, and a rotatable shaft provided with a plurality of contact members adjustable into operative position by rotating said shaft to actuate said lever at predetermined limits of the movement of said tool holder in opposite directions.

3. In combination with a hand operated feed screw shaft, a tool holder to be reciprocally fed by said shaft, a shaft positively driven at a relatively greater speed from said feed shaft, a toothed wheel carried by said positively driven shaft, and means actuated from and at a predetermined position of said tool holder to engage said toothed wheel to stop said feed shaft.

4. In combination with a hand operated feed screw shaft, a tool holder to be reciprocally fed by said shaft, a gear on said screw feed shaft, a shaft provided with a pinion in mesh with said gear, a toothed wheel carried by said pinion shaft, a lever to engage said toothed wheel to stop the rotation of said feed shaft, and means to actuate said lever at a predetermined position of the tool holder.

5. In combination with a hand operated feed screw shaft, a tool-holder to be reciprocally fed by said screw shaft, a rotatable shaft movable endwise with said tool-holder and provided with a plurality of contact members adjustable into operative position by rotating said tool holder actuated shaft, a lever having an adjustable contact member to be engaged by one of the contact members on said endwise moving shaft at a predetermined position of the tool-holder, and a toothed wheel driven rotatably by said feed shaft to be engaged by said lever when actuated to stop the rotation of said feed shaft.

6. In combination with a hand operated feed screw shaft, a tool-holder to be reciprocally fed by said shaft, a rotatable shaft movable endwise with said tool holder and provided with a plurality of contact members adjustable into operative position by rotating said tool holder actuated shaft, a lever to be actuated by engagement with one of said contact members at a predetermined position of the tool holder, and a toothed wheel driven rotatably by said feed shaft to be engaged by said lever when actuated to stop the rotation of said feed shaft.

7. In a device of the character disclosed, a tool-holder, a feed screw therefor, a contact member reciprocally driven by and in unison with the movements of said tool-holder, a reciprocatory stop member actuated by engagement with said contact member, and a rotary stop member driven from and in unison with the movements of said feed screw to inter-engage with said reciprocatory stop member to lock said feed screw against rotation at a predetermined position of said tool holder.

8. In a device of the character disclosed, a tool holder, a feed screw therefor, a contact member reciprocally driven by and in unison with the movements of said tool holder, and stop mechanism actuated by said contact member to lock said feed screw against rotation at a predetermined position of the tool holder independently of the engagement of said screw with the nut of said tool holder.

9. In combination with the cross feed screw shaft of a machine tool, a tool-holder longitudinally reciprocated by the screw portion of said feed shaft, a contact member driven by and movable in unison with the movements of said tool-holder, and stop mechanism actuated by said contact member to arrest the screw rotation at a predetermined position of the tool-holder independently of the engagement of said screw with the nut of said tool holder.

10. A lathe stop feed mechanism, a hand operated feed screw shaft, a tool-holder longitudinally adjustable by and on the intermediate portion of the screw, a plurality of contact members reciprocated by and in unison with the movements of the tool-holder, and stop mechanism actuated by said contact members to interlock the feed screw at a predetermined position of the tool-holder.

11. In a diameter stop, a hand operated screw, a tool-rest engaging said screw, a stop member driven from said screw, and means controlled by the movements of said tool-rest to positively stop said screw-driven stop mechanism at predetermined positions.

12. In a diameter stop, a hand operated screw, a tool rest reciprocated by said screw, a ratchet wheel driven by said screw, and adjustable means connected to said tool rest to positively arrest the angular movement of said ratchet wheel at predetermined positions of said tool rest.

13. In a diameter stop, a hand operated screw, a tool rest driven from said screw, a toothed wheel positively driven from said screw, and means intermediate of said tool rest and said toothed wheel to positively arrest the angular movement of said toothed wheel at predetermined positions.

14. In a tool holder stop mechanism, a hand operated screw, a tool holder moved by said screw, adjustable means actuated from and by the movement of said tool holder to positively arrest the angular movement of said screw at predetermined positions of said screw.

In testimony whereof I affix my signature in the presence of two witnesses.

WILLIAM L. SCHELLENBACH.

Witnesses:
C. W. MILES,
W. THORNTON BOGERT.